United States Patent [19]

Genheimer et al.

[11] Patent Number: 5,047,876

[45] Date of Patent: Sep. 10, 1991

[54] ADAPTIVE PREWRITE COMPENSATION APPARATUS

[75] Inventors: Stephen R. Genheimer, Mustang; Steven V. Holsinger, Oklahoma City, both of Okla.

[73] Assignee: Seagate Technology Inc., Scotts Valley, Calif.

[21] Appl. No.: 319,251

[22] Filed: Mar. 3, 1989

[51] Int. Cl.⁵ ............................................. G11B 5/09
[52] U.S. Cl. ...................................... 360/46; 360/45; 360/51; 360/67
[58] Field of Search ...................... 360/44, 45, 46, 51, 360/67

[56] References Cited

U.S. PATENT DOCUMENTS

| | | | |
|---|---|---|---|
| 3,879,342 | 4/1975 | Patel | 360/45 |
| 4,000,513 | 12/1976 | Precourt | 360/45 |
| 4,205,352 | 5/1980 | Tomada | 360/45 |
| 4,245,264 | 1/1981 | Allen | 360/51 |
| 4,306,257 | 12/1981 | Harman | 360/67 |
| 4,525,753 | 6/1985 | Schimeki et al. | 360/45 |
| 4,633,336 | 12/1986 | Horie et al. | 360/45 |
| 4,635,141 | 1/1987 | Coulter | 360/44 |
| 4,809,088 | 2/1989 | Lofgren et al. | 360/45 X |

Primary Examiner—Roy N. Envall, Jr.
Assistant Examiner—Hung H. Bui
Attorney, Agent, or Firm—Edward P. Heller, III; Bill D. McCarthy; Louis W. Watson

[57] ABSTRACT

An adaptive prewrite compensation apparatus for writing data flux transition data on a magnetic medium, the apparatus incorporated in a disk drive assembly. A serial data pattern is introduced into the apparatus from a drive interface in digital form and is encoded. A combination of a transducing head and a writing location used for writing the data pattern on the magnetic medium is determined by the assembly. A predetermined write delay value based on the combination and the data pattern is computed by the assembly which then writes the data pattern on the magnetic medium with reference to the write delay value so that when the data pattern is read back, the flux transitions are preceived to be at the same distance as when entered into the apparatus.

6 Claims, 3 Drawing Sheets

ADAPTIVE PREWRITE COMPENSATION APPARATUS

BACKGROUND OF THE INVENTION

1. Field of the Invention

The present invention relates generally to a disk drive assembly and delay circuitry for time delay compensation of digital data prior to writing it on a magnetic medium.

2. Brief Description of the Related Art.

Digital data are written on a magnetic medium by the use of flux transitions. A flux transition is a site of change in the physical orientation of the medium, hence a change in the magnetic flux generated by the medium at that site. When a flux transition is written by a transducing head on the medium in a disk drive assembly it is written in the context of the prior flux transition and the next flux transition. When the flux transition is read back by the head, it will typically be perceived to be at a different interval in time in relation to the prior flux transition and the next flux transition. This phenomenon is known as peak shift, a generic term for the problem addressed by the present invention. Peak shift is a problem because if the change in time interval between flux transitions becomes great enough, the data pattern read back from the magnetic medium may be incorrect, i.e. the flux transition may fall outside of its detection "window".

One conventional method of dealing with peak shift is to administer prewrite compensation when writing a data pattern. This means each flux transition written is moved a short interval of time (early or late) so that the peak shift is minimized or at least lessened in most cases. The problem with this approach is that only one value of prewrite compensation is used even though a range of peak shift values is generally significant with respect to any single value of delay.

The present invention is designed to address this unresolved problem by adaptively compensating for peak shift. Adaptivity is achieved by determining the actual peak shifts promulgated by a given disk drive assembly under certain parameters. The parameters adaptively covered by the present invention are: (1) the head/media pair to be used for writing; (2) the writing site on the disk; and (3) the data pattern to be written.

Of interest is Horie et al., U.S. Pat. No. 4,633,336 which uses prewrite compensation based on the above-mentioned parameters but only in a limited sense. The Horie system determines whether prewrite compensation is appropriate based on the parameters and then simply generates a set value of compensation for each parameter, if appropriate. In contradistinction, the present invention does not use a set value for each parameter but rather a value based on the specific combination of parameters used so that the values generated by the present invention are more variable than the values used by Horie and are applied with much more flexibility.

Summary of Invention

The present invention comprises a disk drive assembly and delay circuitry which determines a time delay value appropriate for writing flux transitions on a magnetic medium under a given set of conditions so that the readback signal is received at the desired time. This is accomplished by introducing a serial data pattern into the delay circuitry at a shift register from a drive interface in digital form. The serial data pattern is then decoded at circuitry connected to the shift register. A combination of a transducing head and a writing location used for writing the data pattern on the magnetic medium is determined by the disk drive assembly. An adaptive prewrite delay value (sometimes referred to hereinbelow as a prewrite delay value or a delay value) based on the combination and the data pattern is then computed by the disk drive assembly which then writes the data pattern on the magnetic medium with reference to the write delay value so that, when the data pattern is read back by the head, the flux transitions are perceived to be separated by the same distance in time as when introduced into the shift register.

One object of the invention is to achieve an improved error rate in the read back of written data.

Another object is to increase the performance tolerances for disk drive assembly components such as transducing heads, disks, magnetic media and circuitry elements.

Other objects, features and advantages of the present invention will be apparent from the following detailed description when read in conjunction with the drawings and appended claims.

DESCRIPTION

Figure 1:
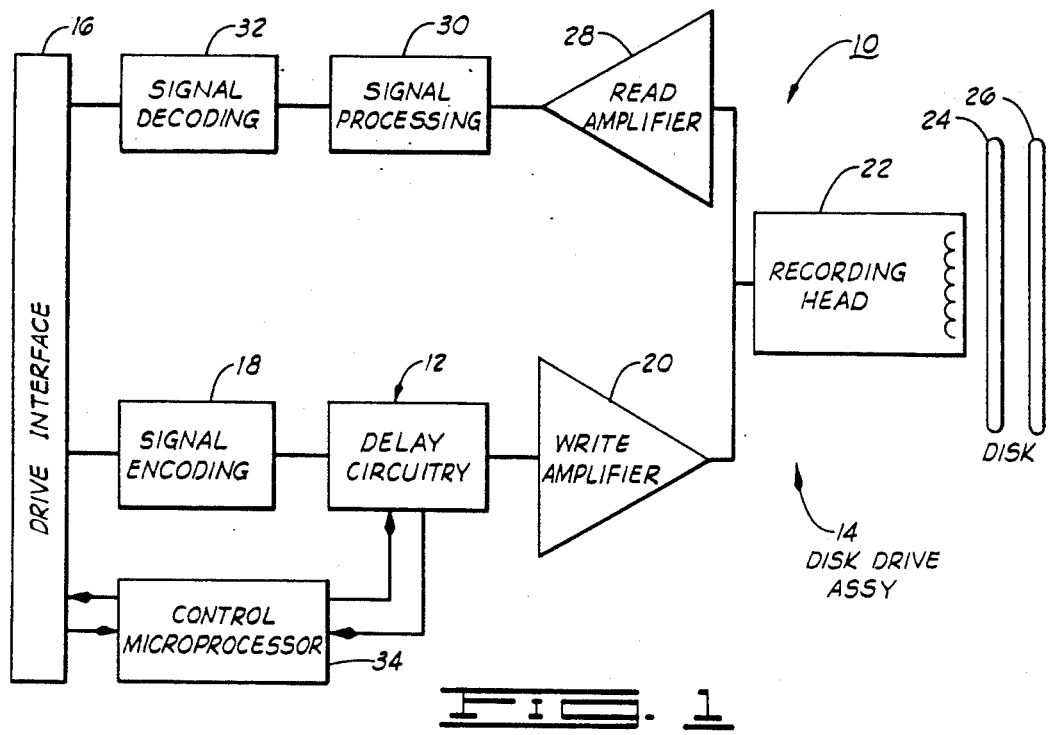
FIG. 1 is a schematic block diagram depicting an adaptive prewrite compensation apparatus constructed in accordance with the present invention.

One of the most useful aspects of a computer is its ability to record and recall data. Recording data is commonly referred to as "writing", while recalling data is commonly referred to as "reading".

Physically speaking, writing is the process of changing a magnetic medium which is located on a disk or plastic tape. The present invention could be applied with either type of material but this disclosure will deal primarily with a hard disk drive assembly. The magnetic medium is typically composed of a material such as a ferrous oxide. Each particle in the medium has an electromagnetic orientation which has associated with it a property known as magnetic flux. When the magnetic flux of each particle is in the same direction, the medium is said to be magnetized. In materials suitably magnetizable, the particles tend to be grouped in magnetization clusters called domains. When the electromagnetic orientation of one domain is reversed in a magnetized magnetic medium, the magnetic flux of the domain is also reversed. Therefore, the magnetic flux of the subject domain is opposite in direction compared to the magnetic fluxes associated with the other domains in the magnetized magnetic medium. A flux transition is said to exist at the boundary of a domain. More specifically, a flux transition occurs at any location where adjacent domains have oppositely directed magnetic fluxes.

The smallest unit of information on a magnetic medium is a bit, or binary digit. A bit is simply a flux transition or the lack thereof. A bit corresponding to a flux transition at a given site is said to be a logical ONE bit. A bit corresponding to the absence of a flux transition at a given site is said to be a logical ZERO bit. A sequence of bits is called a data pattern. The number of bits necessary to make a data pattern will be discussed below. A data code is a system used for configuring a data pattern according to rules associated with the system.

Writing data is essentially the act of creating a series of flux transactions on a magnetic medium. Reading data is essentially the act of detecting or perceiving flux transitions which have been written. The act of reading or writing data on a magnetic medium is performed by a transducing head. The head electromagnetically reads and writes flux transitions on the medium. A data pattern is indicated on the medium by means of ONES and ZEROS.

During readback, a phase locked oscillator is locked to the recovered stream of flux transitions, and develops a timing window which is centered around each possible flux transition site. Flux transitions or the absence of same in each window are converted to digital ONES and ZEROS. This digital data stream is then typically decoded into NRZ code and presented at a disk drive interface. The basic purpose of a disk drive write channel is to cause a flux transition to be written in its correct location on the disk surface. The function of the read channel is to detect the flux transition within the desired timing window. Any time the flux transition falls outside of the expected timing window, an error occurs.

There are many factors that can cause a flux transition to be shifted from the center of the timing window. Defects in the medium can cause the flux transition to be moved or completely missing. Fortunately, these defects are usually stationary and can be detected and mapped around so that data is not written in that region. Noise, whether fundamental noise from the recording process, noise in the readback circuits or environmental noise, can cause a flux transition to be shifted from its normal positions. While the effect of noise on an individual flux transition cannot be predicted, the average effect of noise can be measured. Noise can be assumed to cause flux transitions to be located in a Gaussian distribution around the center of the detection window.

The fundamental limitation as to how such data can be written within a given area is controlled by how closely the flux transitions can be packed together. As flux transitions are moved closer together, the flux transitions begin to interact with each other due to the fundamental magnetic properties of the recording system. This effect is known as peak shift. The interaction of the flux transitions causes a shift in the location of the transitions in the timing window. Data recovery is usually achieved by differentiation to locate the peak of the flux transition, and the peak may be shifted in time as a result of bit crowding. Excessive peak shift can cause the flux transition to move outside of the timing window, resulting in an error. Even peak shift which does not cause a flux transition to move all the way out of the window reduces the allowable margin for other effects such as noise.

The first two factors mentioned as causes of readback errors (media defects and noise) are addressed by control of the media manufacturing process and by careful circuit design to minimize sources of, and susceptibility to, noise. Peak shift effects are treated differently. The effects of peak shift are predictable and repeatable (at least statistically) based upon the actual flux transition spacing, and can be compensated for to some extent by means of prewrite compensation techniques.

The traditional method of dealing with peak shift has been to administer prewrite compensation when writing a data pattern. That is, each flux transition written may be shifted in time by a small amount (in the order of nanoseconds) so that the peak shift is minimized or at least lessened in most cases. The problem with this approach is that only one value of prewrite compensation is used even though a range of peak shift values is generally significant with respect to this one compensation value.

The present invention, an adaptive prewrite compensation apparatus, is designed to deal with the problem of peak shift in a more flexible way by predetermining (on the basis of measurement and/or interpolation) the adaptive write delay value for each permutation of head, writing location, and data pattern. The writing location includes both the particular disk to be written on and the particular site for writing on that disk. Adaptivity can be predetermined without accounting for the head or can even be predetermined taking into account any combination of the parameters of head and writing location. Instead of determining a write delay value based on an average peak shift value for the disk drive assembly, adaptive write delay values are determined experimentally for each head, writing location, and data pattern (or some combination thereof). The adaptive write delay values can then be recorded on a disk of the disk drive assembly for retrieval at each power-up sequence.

Referring now to the drawings in general and to FIG. 1 in particular, shown therein and designated by the general reference 10 in particular, is an adaptive prewrite compensation apparatus. The adaptive prewrite compensation apparatus 10 is comprised of a delay circuitry 12 and a disk drive assembly 14 (the disk drive assembly 14 is everything in FIG. 1 other than the delay circuitry 12). The adaptive prewrite compensation apparatus 10 has a writing channel and a reading channel, the writing channel beginning at a drive interface 16 going to a signal encoding block 18 and to the delay circuitry 12 through a write amplifier 20 to a recording head 22 which addresses a disk 24. Generally, a plurality of disks are used in the practice of the present invention but only two are shown in FIG. 1 for expediency, a disk 26 also shown therein for discussion within the context of the operation of the present invention. The read channel is described by the disk 24, the head 22, a read amplifier 28, a signal processing block 30, and a signal decoding block 32, the control microprocessor 34 participates in, and controls, both channels. FIG. 1 depicts schematically the adaptive prewrite compensation apparatus 10 as used to read and write. Most of the unique circuitry of the present invention is located in the delay circuitry 12. Once the write signal has been encoded, it is then adaptively delayed before being sent to the write amplifier 20. To illustrate the phenomenon of peak shift, an example will be provided herein as to how prewrite compensation without adaptivity is utilized. This means that an arbitrary amount of prewrite compensation is to be imparted to any data pattern.

For this example, it will be assumed that the arbitrary amount of prewrite compensation to be imparted to any data pattern at the delay circuitry 12 is a negative delay of 2 nanoseconds. It will be understood that such delay can be either positive or negative. "Negative delay" means that the time interval for writing a given pair of ONES is decreased. "Positive delay" means the time interval of writing is increased. A further assumption will be that a data pattern is to be sent from the drive interface 16 to the delay circuitry 12 (the delay circuitry 12 is assumed to be nonadaptive for purposes of this example only). The data pattern includes two logical ZEROS located between two logical ONES, A and B (1001) The time interval of each bit is 50 nanoseconds. Therefore, the logical ONES are spaced 150 nanoseconds apart in time so that the delay circuitry 12 will receive the two logical ONE signals A and B 150 nanoseconds apart. If no compensation is imparted to the ONE signals A and B these two ONE signals will be written 150 nanoseconds apart in time on the disk 24. But since the nonadaptive delay circuitry 12 automatically imparts 2 nanoseconds of negative delay, the ONE signals A and B will be written 148 nanoseconds apart. For illustrative purposes, it is further assumed that the peak shift between the ONE signals A and B causes a positive delay of 6 nanoseconds when there is no prewrite compensation whatsoever. This means that when the read channel is activated, the disk drive assembly 14 will detect the two flux transitions at a time interval of 154 nanoseconds, i.e. the ONE signals A and B were written 148 nanoseconds apart (150 nanoseconds minus 2 nanoseconds imparted by the nonadaptive delay circuitry 12) plus 6 nanoseconds delay due to peak shift equals 154 nanoseconds. The signals generated by the ONE signals A and B therefore will be processed 154 nanoseconds apart, and will proceed down the read channel back to the drive interface 16 to appear to have been written 154 nanoseconds apart, rather than the desired 150 nanoseconds, even though actually written 148 nanoseconds apart.

The writing and reading process will now be discussed with the actual systems of the present invention where an adaptive prewrite delay value is imparted to the writing signal. Again, a data pattern is written into the system at the drive interface 16 and sent to the delay circuitry 12 (once again, and from now on the delay circuitry 12 will be considered to be adaptive). The signal is processed in the delay circuitry 12 and an adaptive prewrite delay value is determined based on the recording head 22 which will be used for writing the data, the writing location and the data pattern. That adaptive prewrite delay value is then applied to the data pattern. In this example, since the peak shift is 6 nanoseconds and the desired time interval at readback is 150 nanoseconds, a 6 nanosecond negative delay value is applied, meaning that the ONE signals A and B are written 6 nanoseconds closer in time than if there were no peak shifts. Therefore, the compensated data pattern send logical ONE signals A and B out at a time interval of 144 nanoseconds. The recording head 22 then receives the two writing signals 144 nanoseconds apart and writes them accordingly. During readback, the disk drive assembly 14 perceives the two logical ONE signals A and B to be 150 nanoseconds apart. They are processed at the signal processing circuitry 30 accordingly. When the data pattern is received back at the drive interface 16, the data pattern is read so that the logical ONE signals A and B are 150 nanoseconds apart, thus achieving the desired object of having the same time interval in readback as in the writing channel prior to entering the delay circuitry 12 of the present invention.

Figure 2:
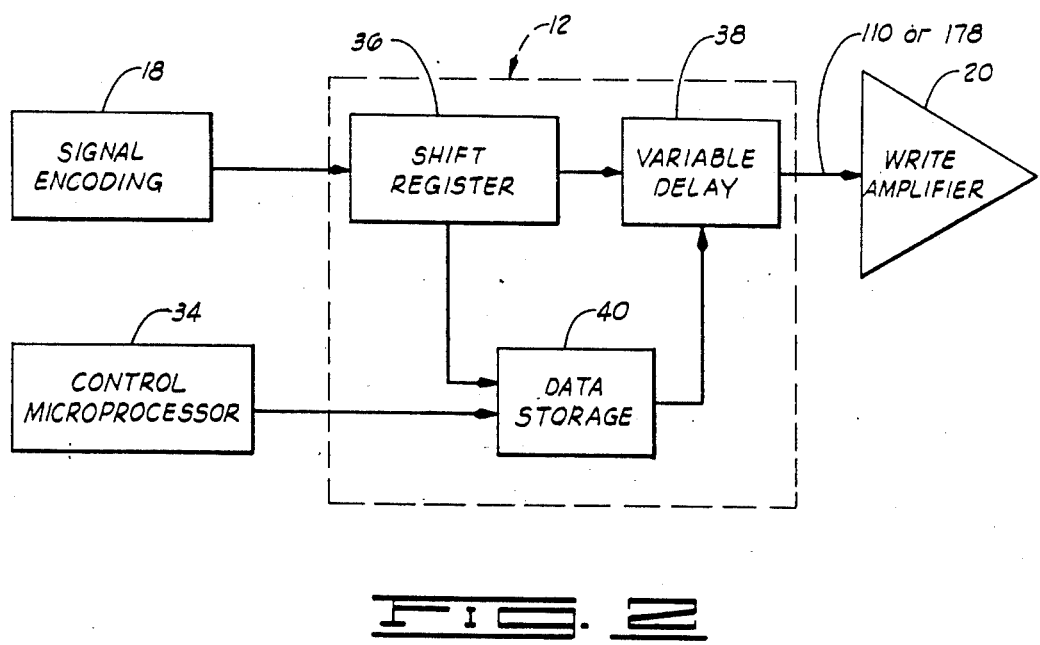
FIG. 2 is a schematic diagram of the delay circuitry of the adaptive prewrite compensation apparatus of FIG. 1.

Referring to FIG. 2, the delay circuitry 12 of the present invention is shown schematically in a block diagram. The data pattern has just been encoded at the signal encoding block 18 and is now received by the delay circuitry 12. The data pattern is received at a shift register 36 and is processed. The data pattern is sent from shift register 36 to a variable delay 38. Simultaneously, the information concerning the data pattern is sent to a data storage element 40 where it is processed and an adaptive prewrite delay value is determined. This information is sent to the variable delay 38 where the adaptive prewrite delay value is applied to the data pattern as it is received from the shift register 36 by adjusting the circuit within the variable delay 38 so that the appropriate number of steps or taps act upon each pulse. The compensated data is then sent out of the variable delay 38 and proceeds along the write channel.

Figure 3:
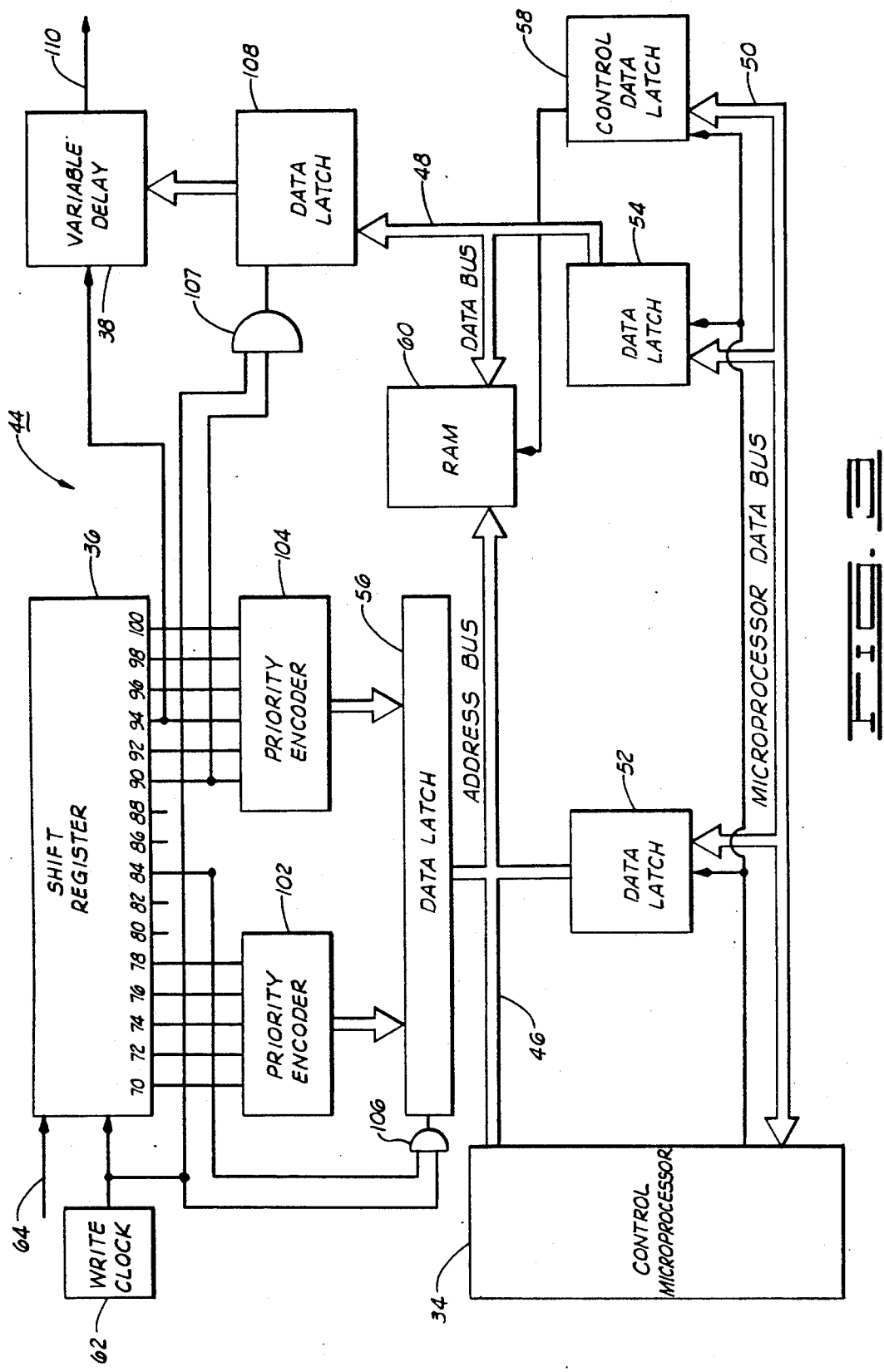
FIG. 3 is a block diagram of one embodiment of the delay circuitry of FIG. 2 in more detail.

Referring to FIG. 3, one embodiment of the delay circuitry 12 of the present invention is depicted by general reference 44. Again, the circuitry 44 is depicted in block diagram form, and can be incorporated into a circuit board; however, for practical manufacturing purposes, the circuitry depicted would probably be incorporated into LSI circuitry.

All the block components depicted in FIG. 3 are connected electronically wherever lines are drawn to connect components as is conventional in circuit diagrams.

In FIG. 3 the delay circuitry 44 is comprised of the following components.

46 is a first databus electronically connecting many components of the circuitry.

48 is a second databus electronically connecting many components of the circuitry.

50 is a databus for a startup mode, hereinbelow referred to as the startup databus, and is that of the control microprocessor 34.

52, 54 and 56 indicate data latches.

58 is a control data latch.

60 is a static RAM.

62 is a write clock.

The control microprocessor 34 is connected to the data latch 52, to the data latch 54 and to the control data latch 58.

The control data latch 58 is connected to the static RAM 60, to the data latch 52, to the data latch 54 and to the data latch 56.

64 is an electronic line where the serial data pattern is inputted.

The shift register 36 has a number of flip-flops designated 70 through 100 (in even numbers).

102 is a last priority encoder.

104 is a first priority encoder.

The priority encoders 102 and 104 are connected to the data latch 56. The data latch 56 is also connected to an AND gate 106 and to the databus 46. The data latch 56 is connected to the databus 46. The databus 46 is also connected to the static RAM 60, the data latch 52, and the control microprocessor 34. The static RAM 60 is also connected to the control data latch 58.

Another data latch 108 is connected to an AND gate 107 which is connected to the shift register 36. The data latch 108 is connected to the variable delay 38, which is connected to the shift register 36. The variable delay 38 has an output line 110 for sending compensated pulse signals to the write amplifier 20 (FIG. 2).

Figure 4:
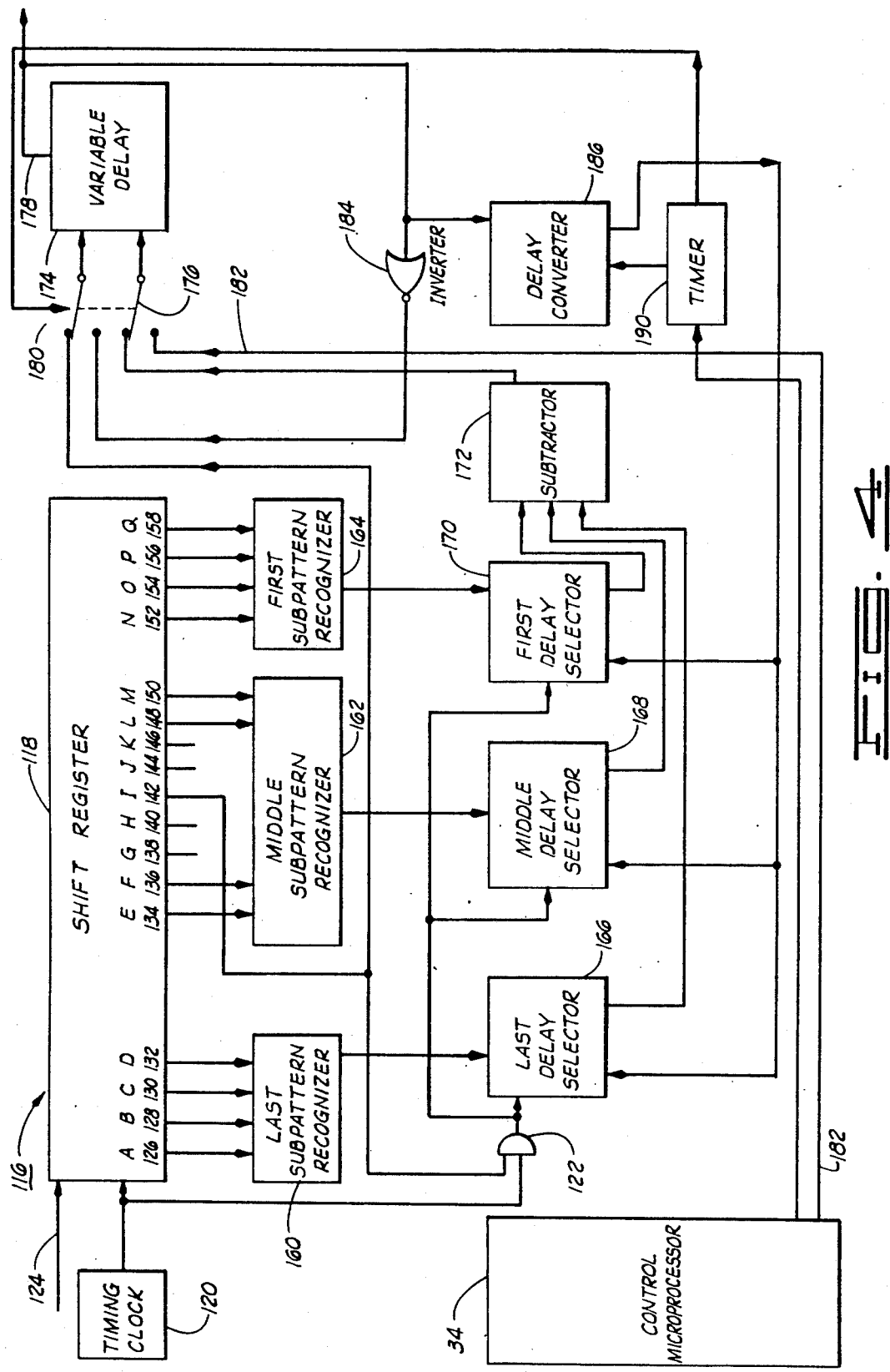
FIG. 4 is a block diagram of another embodiment of the delay circuitry of FIG. 2.

Referring to FIG. 4, another embodiment of the circuitry 12 of the present invention is depicted by general reference 116. It will be understood that the delay circuitry 116 is an alternate construction to that of the delay circuitry 44 for use as the delay circuitry designated by the numeral 12 in FIG. 2.

118 is a shift register.
120 is a timing clock.
122 is an OR gate.
124 is an input line.

The timing clock 120 is connected to an OR gate 121 and the shift register 118. The line 130 receives a serial data pattern and is connected to the shift register 118. The shift register 118 incorporates flip-flops 126–158. The shift register 118 is connected to a last subpattern recognizer 160, a middle subpattern recognizer 162, and a first subpattern recognizer 164.

TABLE 1

| | Data Pattern Shift Register 118 | | | | | | | | | | | | | | | | |
|---|---|---|---|---|---|---|---|---|---|---|---|---|---|---|---|---|---|
| | A | B | C | D | E | F | G | H | I | J | K | L | M | N | O | P | Q |
| t = 1 | 0 | 0 | 1 | 0 | 0 | 1 | 0 | 0 | 1 | 0 | 0 | 0 | 1 | 0 | 0 | 0 | 1 |
| t = 2 | X | 0 | 0 | 1 | 0 | 0 | 1 | 0 | 0 | 1 | 0 | 0 | 0 | 1 | 0 | 0 | 0 |
| t = 3 | X | X | 0 | 0 | 1 | 0 | 0 | 1 | 0 | 0 | 1 | 0 | 0 | 0 | 1 | 0 | 0 |
| t = 4 | X | X | X | 0 | 0 | 1 | 0 | 0 | 1 | 0 | 0 | 1 | 0 | 0 | 0 | 1 | 0 |
| t = 4A | 0 | 0 | 0 | 0 | 0 | 1 | 0 | 0 | 1 | 0 | 0 | 1 | 0 | 0 | 0 | 1 | 0 |

TABLE 2

| | Data Pattern Shift Register 118 | | | | | | | | | | | | | | | | |
|---|---|---|---|---|---|---|---|---|---|---|---|---|---|---|---|---|---|
| | LAST | | | | Middle | | | | | | | | | First | | | |
| | A | B | C | D | E | F | G | H | I | J | K | L | M | N | O | P | Q |
| t = 1 | 0 | 0 | 1 | 0 | 0 | 1 | 0 | 0 | 1 | 0 | 0 | 0 | 1 | 0 | 0 | 0 | 1 |

TABLE 3

| | Last | | | |
|---|---|---|---|---|
| | A | B | C | D |
| NEXT 8T | 1 | 0 | 0 | 0 |
| NEXT 7T | 0 | 1 | 0 | 0 |
| NEXT 6T | 0 | 0 | 1 | 0 |
| NEXT 5T | 0 | 0 | 0 | 1 |
| COMBINATIONS | 1 | 0 | 0 | 1 |

TABLE 4

| | Middle | | | | | | | | |
|---|---|---|---|---|---|---|---|---|---|
| | E | F | G | H | I | J | K | L | M |
| NEXT 4T only | 1 | 0 | 0 | 0 | 1 | 0 | 0 | 0 | 0 |
| NEXT 3T only | 0 | 1 | 0 | 0 | 1 | 0 | 0 | 0 | 0 |
| PREV 4T only | 0 | 0 | 0 | 0 | 1 | 0 | 0 | 0 | 1 |
| PREV 3T only | 0 | 0 | 0 | 0 | 1 | 0 | 0 | 1 | 0 |
| NEXT 3T, PREV 3T | 0 | 1 | 0 | 0 | 1 | 0 | 0 | 1 | 0 |
| NEXT 3T, PREV 4T | 0 | 1 | 0 | 0 | 1 | 0 | 0 | 0 | 1 |
| NEXT 4T, PREV 3T | 1 | 0 | 0 | 0 | 1 | 0 | 0 | 1 | 0 |
| NEXT 4T, PREV 4T | 1 | 0 | 0 | 0 | 1 | 0 | 0 | 0 | 1 |
| NONE | 0 | 0 | 0 | 0 | 1 | 0 | 0 | 0 | 0 |

TABLE 5

| | First | | | |
|---|---|---|---|---|
| | N | O | P | Q |
| PREV 5T | 1 | 0 | 0 | 0 |
| PREV 6T | 0 | 1 | 0 | 0 |
| PREV 7T | 0 | 0 | 1 | 0 |
| PREV 8T | 0 | 0 | 0 | 1 |
| COMBINATIONS | 1 | 0 | 0 | 1 |

A data pattern, in the context of this invention, is a sequence of bits, there being a one-to-one correspondence between the total number of bits in the sequence and the total number of flip-flops in the shift register 118. For example, in the circuit depicted in FIG. 4, the data pattern has 17 bits because the shift register 118 has 17 flip-flops designated by the numbers 126 through 158.

The data pattern associated with the shift register 118 is changed with every pulse of the timing clock 120. This is illustrated in Table 1 where four different data patterns are shown corresponding to four times t=1, t=2, t=3, t=4; the unit of time is the pulse period of the shift register (t=4A corresponds to the same data pattern as t=4, as will be discussed below). The flip-flops of shift register 118 are denominated by the letters A through Q corresponding to the numbers 126 through 158. For example, A represents flip-flop 126, B represents flip-flop 128, C represents flip-flop 130 and so forth. The letters are used in place of the appropriate numbers merely for ease of display in Table 1, and the four data patterns shown are exemplary in nature and have no special significance.

The first data pattern listed in Table 1 is 00100100100010001, residing at the shift register 118 at an arbitrary time, t=1. After the period has elapsed (a typical frequency for such a circuit would be 50 MHZ, hence a period of 20 nanoseconds), the shift register 118 receives a pulse signal via the timing clock 120. At that time each bit shifts one flip-flop to the right to yield a second data pattern X00100100010001000 at t=2. The bit associated with flip-flop A is denominated "X" to remind the reader that this is a new bit, not present in the data pattern of t=1. The same process occurs at t=3 and t=4. The data pattern shown on the line t=4A is the same data pattern shown on the line t=4, but the line at t=4A shows explicitly the value of the three latest bits. The value of all three bits in this case happens to be ZERO.

A subpattern is a subset of the data pattern. In the circuit of FIG. 4, each data pattern has three subpatterns: (1) a last subpattern; (2) a middle subpattern; and (3) a first subpattern. The last subpattern is made sequentially of the four bits located at flip-flops A through D in Table 2; the middle subpattern is made sequentially of the nine bits located at flip-flops E through M; and the first subpattern is made sequentially of the bits located at flip-flops N through Q.

Referring again to Table 1, the central bit in each data pattern is the one at flip-flop I. The purpose of the delay circuitry 116 in FIG. 4 is to adaptively delay (compensate) the bit at flip-flop I (142) if it is a ONE bit. If the bit at I (142) is a ZERO bit, no compensation is performed. In the example of Table 1, the delay circuitry 116 will adaptively delay the bit at flip-flop I when t=1 and t=4, and will perform no delay when t=2 and t=3.

In Table 2, the three subpatterns are delineated for the data pattern 001001001000010001 at t=1. The last subpattern is 0010; the middle subpattern is 010010001; and the first subpattern is 0001. Since by definition in the present invention the data pattern is of interest only if there is a ONE bit at flip-flop I, and wherein the circuit of FIG. 4 is designed to use 2,7 code, data patterns of interest will have middle subpatterns with a XX00100XX configuration (i.e. ZERO bits at G, H, J, and K, and a ONE bit at I. Hence the flip-flops E, F, L, and M in a given middle subpattern may have either a ONE or a ZERO value.

Table 3 illustrates the possible permutations for the last subpattern and the name for each such permutation. It will be understood that if a larger shift register were used, and hence more bits in the last subpattern, there would be more permutations containing two or more ONE bits, but in this circuit only one such permutation is possible in the 2,7 code for the last and first subpatterns.

Table 4 illustrates the possible permutations for the middle subpattern and the name of each. "NEXT 4T only" identifies the middle subpattern permutation having a ONE bit at flip-flop E, four bits later in time from the central bit at flip-flop I, the central bit being the only other ONE bit in this permutation. "NEXT 3T, PREV 3T" identifies the middle subpattern permutation having ONE bits only at flip-flops F, I, and L. The bit at F is three bits later in time than the central bit I, and the bit at L is three bits previous in time to the central bit.

Table 5 illustrates the possible permutations for the first subpattern and the name of each. "PREV 5T" means previous 5T and identifies the first subpattern permutation having a ONE bit at flip-flop N, five bits prior in time to the central bit I.

From the foregoing it will be clear that the data pattern for t=1 in Table 1 (001001001000010001) can be described as having a NEXT 6T last subpattern (0010 in Table 3); a NEXT 3T, PREV 4T middle subpattern (010010001 in Table 4); and a PREV 8T first subpattern (0001 in Table 5).

Referring again to FIG. 4, the last subpattern recognizer 160 is connected to a last delay selector 166 which can select a delay subvalue corresponding to the appropriate last subpattern permutation (each subpattern permutation has a delay subvalue associated with it). The last delay selector 166 has a delay step for each last subpattern permutation where the appropriate delay subvalue is stored. NEXT 8T is the site where the delay subvalue is stored which corresponds to a NEXT 8T last subpattern, as depicted in Table 3.

Similarly, the middle subpattern recognizer 162 is connected to a middle delay selector 168, which has a delay step corresponding to each permutation shown in Table 4 where appropriate delay subvalues are situated. A delay step near the middle of the variable delay 174 should be used for the NONE middle subpattern to act as a standard or default delay step.

The first subpattern recognizer 164 is connected to a first delay selector 170. The first delay selector 170 has delay steps corresponding to the permutations shown in Table 5.

Codes other than 2,7 code may be used by modifying the patterns of Tables 3, 4 and 5. Connection of the shift register 118 to the subpattern recognizers 160, 161 and 164 may also need changes.

The delay selectors 166, 168 and 170 are connected to a subtractor 172. The subtractor 172 is connected to a variable delay 174 through a first variable delay input switch 176. The variable delay 174 is connected to an output 178 which carries a compensated data pattern out of the delay circuitry 116. The variable delay 174 is also connected to the central flip-flop 142 of the shift register 118 via a second variable delay input switch 180. The variable delay 174 is further connected via a maximum delay input line 182 to the control microprocessor 34 for inputting a maximum delay step signal to the variable delay 174 through the first variable delay input switch 176. The variable delay 174 is also connected to an inverter 184 and a delay converter 186. The delay converter 186 is connected to the last delay selector 166, the middle delay selector 168, and the first delay selector 170. A timer 190 is connected between the control microprocessor and the delay converter 186.

Referring again to FIG. 3, once the delay circuitry 44 has been constructed, the adaptive prewrite delay values are determined experimentally. The first thing that is determined is what code will be used for the circuitry. Once that has been established, the number of code permutations that can appear in the shift register 36 can be computed. If practicable, each data pattern or subpattern permutation can be tested for individually. The method of testing will be discussed hereinbelow. If testing is not practicable, another technique is to determine stereotypical data patterns. This is the function of the priority encoding system.

Only the closest logical ONE to a central logical ONE is considered by each decoder. Hence if a pattern exists where a logical one occurs two bits away and another logical one four bits away, so that the sequence would be 00101001, the other sequence would be 00001001, the last one being the central logical one. Using the stereotypical data pattern method, the two data patterns would be treated identically in terms of the delay compensation value. The delay value for the pattern 00001001 would be determined experimentally and any other pattern falling within that mode would be assumed to require the same amount of compensation. Once the stereotypical data patterns are determined, then testing is done for each stereotypical data pattern with each head and each writing zone. The amount of peak shift for each permutation is determined by reading and writing. Each disk is divided up into writing zones by means of marking writing zone boundaries. For tracks falling within a given writing zone the value of compensation to be used will be interpolated in a linear fashion.

Once all of the delay values have been experimentally measured, the values are recorded on a disk of the disk drive assembly so that each permutation of stereotypical data pattern, head, and writing zone boundaries has a particular delay value associated with it. Each one of these delay values is given an address and written on the disk for downloading use at each power-up sequence.

In operation, the delay circuitry 44 depicted in FIG. 3 has two modes, a start-up mode and a functional mode. The start-up mode is utilized when the adaptive prewrite compensation apparatus 10 is experiencing a power-up. At that time, the control microprocessor 34 will send a signal to begin the start-up mode. The control microprocessor 34 sends an address signal to the first data latch 52, to the second data latch 54, and to the control data latch 58. The control data latch 58 then sends an enabling signal to the first data latch 52 and a disabling signal to the third data latch 56 and the fourth data latch 108. The enabling signal allows the first data latch 52 to access the databus 46 while the disabling signal prevents access to the databus 46 by the third data latch 56 and the fourth data latch 108. These signals are maintained as along as the circuitry is in the start-up mode, so that first data latch 52 can input data into the static RAM 60.

The control microprocessor 34 then sends an address through the first data latch 52 to the static RAM 60. All of the delay values and corresponding addresses are retrieved from the disk 24 (FIG. 1), loaded into the control microprocessor 34 and then loaded into the static RAM 60. The delay values for all permutations are downloaded from the disk 24 through the microprocessor 34 into the static RAM 60 via the data latch 54 and the second databus 48. The address for a given delay value is input through the first data latch 52 into the RAM 60 via the databus 46. Once all of these predetermined data and addresses have been downloaded the startup sequence is completed. The delay values are downloaded into flip-flops in the memory matrix of the static RAM 60.

Once the start-up sequence has been completed, a disabling signal is sent to the first data latch 52, and an enabling signal is simultaneously sent to the data latch 56 and the data latch 108. The functional mode then becomes operative.

In the functional mode, the serial pattern is inputted into the shift register 36 through the line 64. The write clock 62 controls the period of the delay circuitry 44. The write clock pulse is transmitted to the shift register 36. Once a given bit is inputted into the shift register 36, it is sent to the first flip-flop 70. Simultaneously, the bit which was stored at 70 goes to 72, the bit which was at 72 goes to 74, and so forth. The final bit located at 100 of the shift register 36 is lost. The central bit is located at flip-flop 84 of shift register 36. If there is a logical ONE bit at flip-flop 84 of shift register 36, at a given time, the delay circuitry 44 computes a delay value. If there is a logical ZERO at the central bit site 82, the delay circuitry 44 performs no computation for that data pattern. When a logical ONE is inputted into flip-flop 84 of shift register 36, the flip-flop 84 sends a logical ONE signal to activate the data latch 56 to perform the operation for which the present invention is designed.

Simultaneously with the arrival of a logical ONE at flip-flop 84, any logical ONES located at flip-flops 70–78 go to the last priority encoder 102. There can be no logical ONES at 80 or 82 because of the rules for the 2,7 encode. Also, signals are simultaneously sent from the flip-flops 90–98 to the first priority encoder 104. Likewise flip-flops 86 and 88 can have no logical ONES located there when a logical ONE is located at flip-flop 84 because of the 2,7 code rules. The last priority encoder 102 determines the closest logical ONE to the central logical ONE. In other words, if there is a logical ONE at flip-flop 78, the last priority encoder 102 quits its search and employs a stereotypical data subpattern for 00001001. If it does not find a logical ONE at flip-flop 78, it looks for one at flip-flop 76, and so forth through flip-flop 70. If there is no logical ONE located at any of these flip-flops, it is assumed that this is a maximum spacing for the 2,7 code i.e. 100000001. Likewise the first priority encoder 104 looks first at the flip-flop 90 for a logical ONE closest to the central logical ONE. If it finds one there, it employs the stereotypical data subpattern 10010000. If a logical ONE is not found at the flip-flop 92, sequentially the first priority encoder 104 looks at flip-flops 92–100.

As that particular data subpattern moves down the series of flip-flops, two things happen. First, when the central logical ONE for the data pattern in question moves three flip-flops, i.e. three periods later, that signal is not only sent from flip-flop 88 to flip-flop 90 but also from flip-flop 90 to the data latch 108 through gate 107 as a timing signal so that a write delay value is received from the RAM 60 and latched into the data latch 108.

When the same signal arrives at flip-flop 94, i.e. when another two periods have transpired, that signal is not only sent to flip-flop 96 but also to the variable delay 38 where that signal is operated on such that it is compensated according to the appropriate delay value which has been latched into the data latch 108.

Before that can happen, the stereotypical data subpatterns of the last priority encoder 102 and the first priority encoder 104 are sent to the data latch 56 where the complete stereotypical data pattern thereat is the combination of the last stereotypical data pattern combined with the first stereotypical data pattern to give a complete data pattern. This complete data pattern is sent to the static RAM 60 where the address of this complete stereo-typical data pattern is accessed in combination with the head and writing zone sent from the control microprocessor 34. When the complete address is determined, the delay value for that unique permutation is accessed and that delay value is then sent to the data latch 108 where it controls the number of steps for the adjustment so that the appropriate number of delay steps is in the circuit going from the flip-flop 94 and out the line 110 for compensated data.

The delay circuitry 44 continues to process logical ONES in the same fashion, each logical ONE arriving at the shift register 36 and becoming the central logical ONE for a given pattern, in turn, and then eventually arriving at the flip-flop 94 where the signal for the logical ONE is sent to be operated upon with the appropriate delay value.

The connections between the shift register 36, the variable delay 38 and the data latch 108 are chosen so that the circuit timing requirements of the RAM 60 and the data latches are satisfied. The actual connections may change if faster or slower circuitry is used.

The delay circuitry 116 of FIG. 4 employs a technique known as effect isolation. In contradistinction to the delay circuitry 44 in FIG. 3, in delay circuitry 116 data patterns are broken down into subpatterns, and then subvalues for the subpatterns are calculated independently. In other words, when a logical ONE is located at flip-flop 152 in the shift register 118, subvalues are determined for the last subpattern, the middle subpattern and the first subpattern. In effect isolation, the last subpattern, described by the flip-flops 126–132, is assumed to be isolated from and not affected by the other subpatterns. The number of bits in the respective subpatterns is chosen in order to maximize the accuracy of this assumption. In this system, then, a subvalue must be determined for the last subpattern recognizer 160, the middle subpattern recognizer 162, and the first subpattern recognizer 164. Each subpattern recognizer is not priority encoded but rather considers the bit at each flip-flop. For example, in the last subpattern recognizer 160, there could be a 5T, 8T combination subpattern or a 5T subpattern or a 6T subpattern or a 7T subpattern or an 8T subpattern. This is also the case for the first subpattern recognizer 164. Each one of those subpatterns would have a distinct subvalue which would be selected at delay selectors 164, 168 and 170, respectively. The effect of the three individual subvalues would then be processed at the subtractor 172 to give a delay value for compensating the central bit when it was written. Each permutation for each subpattern will be tested experimentally with each writing location and the head appropriate to the location. The writing locations are divided into writing zones by means of radial zone boundaries. For example, a disk might have five writing zones on each side with one hundred or more tracks between any two zone boundaries. The subvalues will be linearly interpolated based on the two closest zone boundaries. All of these subvalues for each permutation will be stored on a disk 24 of the disk drive assembly 14.

In certain cases, the variable delay 174 may be implemented with delay step elements that may change delay greatly over circuit temperature and voltage. Thus, the absolute delay needed for each subpattern permutation must be converted to the proper number of delay steps to get the proper variable delay 174 during writing. This is done in a conversion mode during microprocessor download of the delay subvalues for each subpattern. The conversion mode, as described hereinbelow, should be utilized frequently in order to correct the delay subvalues for changes in track, circuit temperature and voltage.

When a particular track is selected for writing, the control microprocessor 34 puts the delay circuitry 116 into the conversion mode by sending absolute delay values for each subpattern to the delay circuitry 116. The delay control switch 176 is switched from subtractor 172 to a processor controlled fixed number of delay steps. The undelayed input switch 180 is switched to delay the output of the inverter 184. At this point, a ring oscillator is effectively formed by the inverter 184 and the variable delay 174. The frequency of the oscillator is: the inverse of two times the total propagation delay of the delay step elements selected in the variable delay 174. This is because each delay step element must propagate low then high once for each oscillation period. The correction for delay changes over temperature and voltage can then be sensed by the frequency of the ring oscillator.

The absolute delay value is sent to the timer 190 which performs a timeout proportional to the desired delay value. During this timeout, the oscillations from the ring oscillator 174 /184 are counted by the delay converter 186. Thus, the number of delay element steps needed to perform a particular delay can be counted during this timeout.

Each converted subvalue is then sent back to the delay step at the appropriate delay selector where it is ready for use. This converted subvalue will be correct as long as the above-mentioned factors are not changed. The conversion mode is done on the fly. Most often this conversion mode will be used when a new track is being accessed. This conversion mode is completed for each delay step for each delay selector (i.e. each permutation of each subpattern) by the time the new track is accessed.

The final mode, the operational mode, is the one in which data is actually compensated before being recorded on the disk medium. Initially the serial data pattern is inputted into the shift register 118. The write clock 120 provides the period, usually in the range of about 50 nanoseconds per period, i.e. one bit is transferred every 50 nanoseconds. The bits are received sequentially into the data shift register 118 at the initial flip-flop 126 and then transferred down the line from flip-flop 126 to flip-flop 128, from flip-flop 128 to flip-flop 130 and so on until the first bit of the data pattern reaches flip-flop 158, when another pulse from the write clock 120 is given, that particular bit (the first one in the data pattern) at flip-flop 158 is lost. The write clock 120 also gives timing pulses to each of the delay selectors as they receive subpatterns sent to them by the subpattern recognizers. Whenever there is a logical ONE bit at the flip-flop 142, i.e. there is a central logical ONE, the clock enable gate 122 will allow each subpattern selector 166, 168, 170 to select the proper delay for the subpatterns recognized at subpattern recognizers 160, 162 and 164. The names for these subpattern recognizers result from the fact that the first subpattern recognizer 164 uses the data bits which have been in the shift register 118 longest i.e. they were the first data bits to enter the shift register 118, particularly the bit at flip-flop 158 is the first of all data bits to enter the shift register 118. Likewise the bit at the flip-flop 156 is the first after flip-flop 158 to have entered the shift register 118. So the last data bit to have entered the shift register 118 is the one at flip-flop 126. This sequence is constantly changing as the data bits move sequentially to the right one flip-flop per pulse of the write clock 120. Logical ONE bits send signals to the subpattern recognizers at any time there is a central logical ONE. For example, say there is a central logical ONE at the flip-flop 142. Further, say that there is a logical ONE at flip-flop 126, a logical ZERO at flip-flop 128, flip-flop 130 and the flip-flop 132. The flip-flop 126 would send a high signal, i.e. a relative voltage of 5 volts, to the last subpattern recognizer 160. The last subpattern recognizer 160 receiving no high signals from flip-flop 128, flip-flop 130, or the flip-flop 132 would then evaluate the subpattern as being a 1000 subpattern. It would then send a signal to that effect to the last delay selector 166. The last delay selector 166 would then access the converted delay step for 8T and would send the converted subvalue (obtained during the conversion mode) to the subtractor 172. In the same fashion the middle subpattern recognizer 162 and the first subpattern recognizer 164 would also send signals to the middle delay selector 168 and the first delay selector 170 respectively. Each of the delay selectors would then send corrected delay step values to the respective inputs at the subtractor 172.

The subtractor 172 then takes those three values, the value at its middle input having an absolute positive delay step value, the values at the last input and the first input thereof having either algebraic sign. The total sum is given by the formula the absolute value of the middle input minus the value of the last input minus the value of the first input so that a total delay step value is determined. The subtractor 172 then sends this to the variable delay 174 describing how many delay-steps are to be used on the bit associated with this delay value. The variable delay 174 receives a signal from the bit which was the central logical ONE at flip-flop 142 through the variable delay input switch 180. This allows a certain amount of time for the delay value to be computed. Before the variable delay 174 receives the signal, the variable delay 174 forms the appropriate number of delay steps so that the data signal is compensated appropriately. The compensated data bit is sent out of the variable delay 174 via the output line 178 to other components of the disk drive assembly 14. Each logical ONE bit is processed by the delay circuitry 12 in this fashion.

To implement the delay circuitry 116 with slow logic, it may be necessary to modify the last subpattern recognizer 160, the last delay selector 166 and the subtractor 172 so that two final delay values are calculated in the subtractor 172 to correct either state of flip-flop 126 before it is known. Once this bit does enter the shift register 118 at flip-flop 126, one of the two values calculated can be selected in a mux (not shown) placed between the subtractor 172 and the variable delay 174 so as to choose the appropriate value based on the bit at flip-flop 126. This is an effective way to design the circuit, but the embodiment depicted in FIG. 4 is used herein for illustrative purposes as such is easier to explain and comprehend.

It will be clear that the present invention is well adapted to carry our the objects and attain- the ends and advantages mentioned as well as those inherent therein. While presently preferred embodiments of the invention have been described for purposes of this disclosure, numerous changes may be made which will readily suggest themselves to those skilled in the art and which are encompassed within the spirit of the invention disclosed and as defined in the appended claims.

What is claimed is:

1. An adaptive prewrite compensation apparatus for writing data on a magnetic medium, the apparatus comprising:

data supply means for introducing a serial data pattern into the apparatus;
   data storage means for storing the data pattern;
   encoding means for encoding the data pattern;
   write delay determination means for determining a write delay value;
   application means for applying the write delay value to the data pattern; and
   writing means for writing the data pattern with the applied write delay value so that when the data pattern is read back, bits of the read data pattern will have the same temporal spacing as bits of the pattern as received from the data supply means;
   wherein the writing means employs a code decoder and a disk drive assembly containing at least one disk;
   wherein the data supply means employs a code encoder, a timing clock, and a disk drive interface suitable for manually entering data patterns into the adaptive prewrite compensation apparatus; wherein the data storage means employs a shift register; wherein the decoding means is a plurality of subpattern recognizers; wherein the write delay determination means employs a plurality of delay selectors, one for each subpattern recognizer; and wherein the write delay determination means further employs a subtractor.

2. The adaptive prewrite compensation apparatus of claim 1, wherein the write delay determination means further employs a variable delay.

3. The adaptive prewrite compensation apparatus of claim 2 wherein the write delay determination means further employs a delay converter with a timer.

4. The adaptive prewrite compensation apparatus of claim 3 wherein the write delay determination means further employs a microprocessor for supplying a commanded absolute delay.

5. The adaptive prewrite compensation apparatus of claim 4 wherein the shift register, the subpattern recognizers, the delay selectors, the subtractor, the variable delay and the delay converter with the timer are configured on an LSI circuit.

6. The adaptive prewrite compensation apparatus of claim 5 wherein there are two sets of the circuitry incorporating the shift register, the subpattern recognizers, the delay selectors, the subtractor, the variable delay, and the delay converter with the timer, so that two independent values for the data pattern component of the write delay value may be computed, one being for a value of logical ONE for the last bit to enter the shift register, the other being for a value of logical ZERO for the last bit to enter the shift register.

* * * * *

UNITED STATES PATENT AND TRADEMARK OFFICE
CERTIFICATE OF CORRECTION

PATENT NO. : 5,047,876
DATED     : September 10, 1991
INVENTOR(S) : Steven V. Holsinger It is certified that error appears in the above-identified patent and that said Letters Patent is hereby corrected as shown below:

Cover Sheet, TOP LINE, delete "Genheimer et al." and substitute therefor --Holsinger--; and Cover Sheet [75] Inventors: delete "Stephen R. Genheimer, Mustang, Steven V. Holsinger, Oklahoma City, both of Okla." and substitute therefor --Steven V. Holsinger, Oklahoma City, Okla.--.

Signed and Sealed this

Eighteenth Day of May, 1993

Attest:

MICHAEL K. KIRK

*Attesting Officer*         *Acting Commissioner of Patents and Trademarks*